US 6,701,403 B2

(12) United States Patent
Lary et al.

(10) Patent No.: US 6,701,403 B2
(45) Date of Patent: Mar. 2, 2004

(54) SERVICE PROCESSOR ACCESS OF NON-VOLATILE MEMORY

(75) Inventors: Richard A. Lary, Tualatin, OR (US); Daniel H. Bax, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/969,262

(22) Filed: Oct. 1, 2001

(65) Prior Publication Data

US 2003/0065893 A1 Apr. 3, 2003

(51) Int. Cl.⁷ .............................................. G06F 12/00
(52) U.S. Cl. ...................... 710/305; 711/103; 711/163; 710/306; 710/311; 710/312; 710/313; 365/230.02
(58) Field of Search ................................ 711/103, 163; 710/305, 306, 311, 312, 313; 365/230.02

(56) References Cited

U.S. PATENT DOCUMENTS

| | | | |
|---|---|---|---|
| 5,566,344 A | 10/1996 | Hall et al. | |
| 5,872,945 A | 2/1999 | Wett | |
| 5,968,140 A | 10/1999 | Hall | |
| 5,999,476 A | 12/1999 | Dutton et al. | |
| 6,052,754 A | 4/2000 | Anand | |
| 6,112,311 A * | 8/2000 | Beardsley et al. | 714/3 |
| 6,158,015 A | 12/2000 | Klein | |
| 6,161,157 A | 12/2000 | Tripathi et al. | |
| 6,256,744 B1 | 7/2001 | Simonich et al. | |
| 6,272,580 B1 * | 8/2001 | Stevens et al. | 710/241 |
| 6,321,286 B1 * | 11/2001 | Goodrum et al. | 710/311 |
| 2002/0083258 A1 * | 6/2002 | Bauman et al. | 710/311 |
| 2002/0143967 A1 * | 10/2002 | Derr | 709/230 |

FOREIGN PATENT DOCUMENTS

WO     WO 01/24014 A1     4/2001

OTHER PUBLICATIONS

ETG White Paper, "A good thing in a small package: comparing the IBM eserver pSeries 640 to the Sun E420R," Oct. 2000, prepared by Enabling Technologies Group, Inc., http://ww.etginc.com.

* cited by examiner

Primary Examiner—Mano Padmanabhan
Assistant Examiner—Jasmine Song
(74) Attorney, Agent, or Firm—Law Offices of Michael Dryja

(57) ABSTRACT

Non-volatile memory access, such as firmware access by a service processor, is disclosed. The service processor asserts a controller signal to select either a first non-volatile memory, or a second non-volatile memory. The first non-volatile memory is located behind a first bridge controller and is otherwise accessible by the service processor. The second non-volatile memory is located behind a second bridge controller and is otherwise accessible only by a processor other than the service processor. The service processor then access the selected non-volatile memory, via a bus communicatively coupled to both the non-volatile memories.

16 Claims, 4 Drawing Sheets

SERVICE PROCESSOR ACCESS OF NON-VOLATILE MEMORY

BACKGROUND OF THE INVENTION

1. Technical Field

This invention relates generally to non-volatile memory, such as firmware, and more particularly to accessing such non-volatile memory, such as by a service processor.

2. Description of the Prior Art

Modem computer systems typically have firmware, or other non-volatile memory. Firmware is generally a category of memory chips that hold their content without electrical power and include read-only memory (ROM), programmable ROM (PROM), erasable and programmable ROM (EPROM) and electrically erasable and programmable ROM (EEPROM) technologies. Firmware becomes "hard software" when holding program code. For example, in some computer systems, the firmware may include the basic input/output system (BIOS) of a system. The BIOS is a set of routines in a computer, which is stored on a chip and provides an interface between the operating system and the hardware. The BIOS supports all peripheral technologies and internal services, such as the real-time clock.

The firmware or other non-volatile memory for a given computer system, such as those relying on chipset architectures designed by Intel Corp., of Santa Clara, Calif., may be located behind each of two different bridge controllers of the architecture. One of the bridge controllers, commonly referred to as the Northbridge controller, is the controller for the front-side bus that interfaces between the central processing units (CPUs) of the computer system, and all high-speed components, such as memory, the Accelerated Graphics Port (AGP) bus, and the Peripheral Component Interconnect (PCI) bus. The other bridge controller, commonly referred to as the Southbridge controller, stems from the PCI bus, and is the controller for Integrated Drive Electronics (IDE) drives and lower-speed ports, such as Universal Serial Bus (USB) ports, serial ports, audio ports, and so on. For other Intel chipset architectures, a memory controller hub (MHC) replaces the Northbridge controller, and an I/O controller hub (ICH) replaces the Southbridge controller, with similar, but not identical, functionality.

In multi-node computer systems, there are a number of nodes, each possibly having its own chipset architecture, CPUs, and so on, over which processing is distributed. Each node of the multi-node computer system further usually has a service processor, located behind the Southbridge controller. The service processor is typically responsible for handling maintenance and other service-oriented tasks for its node.

A difficulty with current chipset architectures, however, is that the service processor of a node only has access to firmware located on the Southbridge side of the node. That is, the firmware located on the Northbridge side of the node is inaccessible to the components located behind the Southbridge controller, such as the service processor. This means that the service processor cannot maintain the firmware located behind the Northbridge controller, which is problematic in situations where the service processor is responsible for such maintenance, such as in multi-node computer systems. For these described reasons, as well as other reasons, there is a need for the present invention.

SUMMARY OF THE INVENTION

The invention relates to non-volatile memory access, such as firmware access by a service processor. In a method of the invention, a service processor asserts a controller signal to select either a first non-volatile memory, or a second non-volatile memory. The first non-volatile memory is located behind a first bridge controller and is otherwise accessible by the service processor. The second non-volatile memory is located behind a second bridge controller and is otherwise accessible only by a processor other than the service processor. The service processor then accesses the selected non-volatile memory, via a bus communicatively coupled to both the non-volatile memories.

A system of the invention includes a first and a second processor, a first and a second bridge controller, a first and a second non-volatile memory, and a control line. The first non-volatile memory is located behind the first bridge controller and is normally accessible by the first processor. The second non-volatile memory is located behind the second bridge controller and is normally accessible only by the second processor. The control line extends from the first processor and multiplexes the first and the second non-volatile memories, enabling the first processor to access both of these non-volatile memories.

An article of manufacture of the invention includes a computer-readable medium and means in the medium. The means is for asserting a control signal to access a desired non-volatile memory selected from a first and a second non-volatile memory. The first non-volatile memory is located behind a first bridge controller and normally accessible. The second non-volatile memory is located behind a second bridge controller and otherwise inaccessible. Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
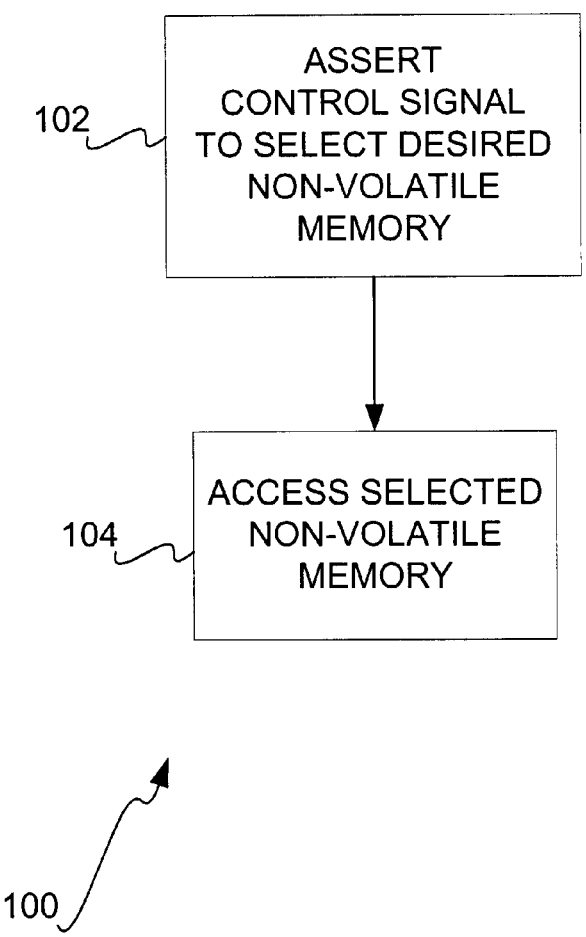
FIG. 1 is a flowchart of a method according to a preferred embodiment of the invention, and is suggested for printing on the first page of the issued patent.

FIG. 1 shows a method 100 according to a preferred embodiment of the invention. A service processor of a node of a multi-node computer system asserts a control signal to select a desired non-volatile memory (102). For example, there may be two non-volatile memories, where each is firmware. The first non-volatile memory is located behind a first bridge controller, such as a Southbridge controller, and is otherwise accessible by the service processor. The second non-volatile memory is located behind a second bridge controller, such as a Northbridge controller, and is otherwise accessible by processors other than the service processor. The non-volatile memories are preferably initially multiplexed via a control line on which the control signal is asserted. The service processor asserts a first value of the control signal on the control line to select the first non-volatile memory, and a second value to select the second non-volatile memory.

The service processor then accesses the selected non-volatile memory (104). For example, the service processor may update and/or maintain the selected non-volatile memory. Such processes may include either reading from the selected non-volatile memory, writing to the selected non-volatile memory, or both. The functionality of the method 100 may further be implemented as a means in a computer-readable medium of an article of manufacture. For instance, the computer-readable medium may be a recordable data storage medium or a modulated carrier signal.

Technical Background

Figure 2:
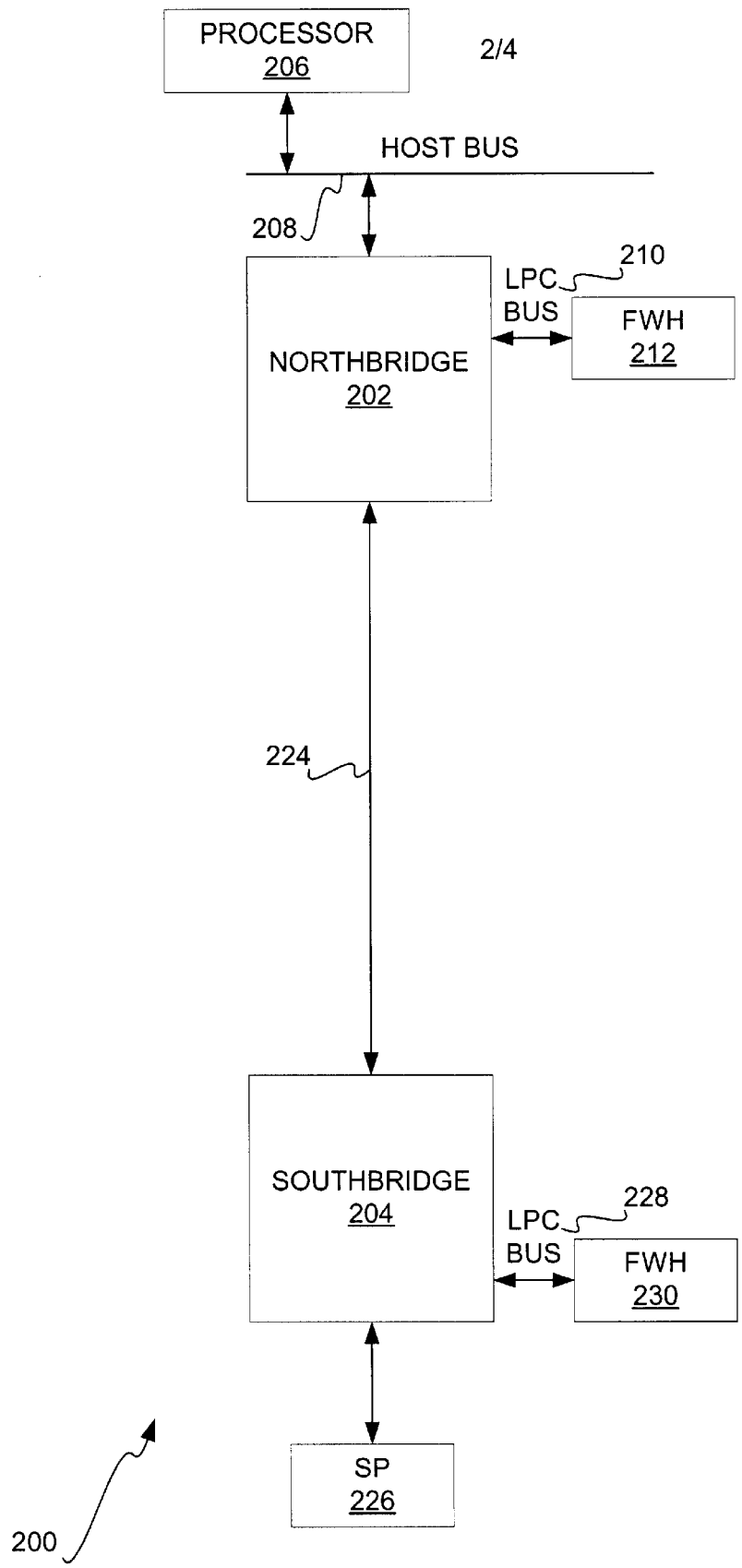
FIG. 2 is a diagram of an example computer architecture in conjunction with which an embodiment of the invention can be implemented.

FIG. 2 shows an example computer architecture 200 in accordance with which embodiments of the invention may be implemented. Components of the architecture 200 not related to implementation of embodiments of the invention are not shown in FIG. 2. The architecture 200 includes a Northbridge controller 202 and a Southbridge controller 204. Each of the Northbridge controller 202 and the Southbridge controller 204 is a type of bridge controller that bridges some components of the architecture 200 with other of the components of the architecture 200.

The Northbridge controller 202 is communicative coupled to the host bus 208, to which central processing units (CPUs) are also communicatively coupled, such as the processor 206. The Northbridge controller 202 is also communicatively coupled to the low-pin count (LPC) bus 210, to which firmware is also communicatively coupled, such as the firmware 212. The firmware 212 is specifically accessible only by components communicatively coupled to the Northbridge controller 202, and not by components communicatively coupled to the Southbridge controller 204, such as the service processor 226, without benefit of an embodiment of the invention. The firmware 212 is more generally a type of non-volatile memory.

The Southbridge controller 204 is communicatively coupled to the Northbridge controller 202, as indicated by the line 224. The service processor 226 is also communicatively coupled to the Southbridge controller 204. The service processor 226 normally does not have access to components located behind the Northbridge controller 202. The service processor 226 thus does not have access to the firmware 212. The service processor 226 rather is considered a component behind or on the side of the Southbridge controller 204, in that it normally has access to other components located behind the Southbridge controller 204. The Southbridge controller 204, like the Northbridge controller 202, is communicatively coupled to a low-pin count (LPC) bus, specifically the LPC bus 228, for normal access to firmware, specifically the firmware 230.

Service Processor Access to Firmware Behind Northbridge Controller

Figure 3:
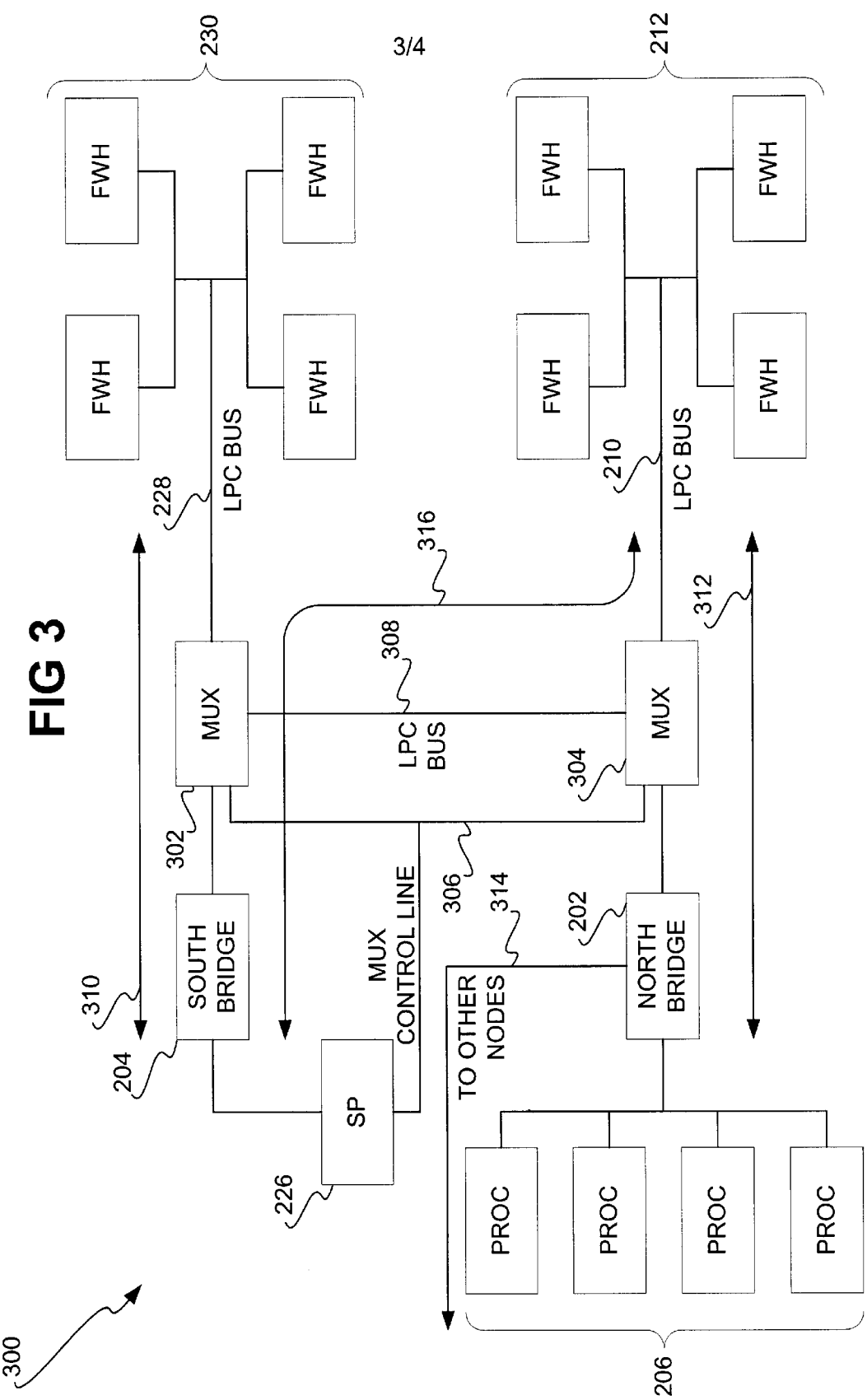
FIG. 3 is a diagram of the architecture of FIG. 2 in which an embodiment of the invention has been implemented.

FIG. 3 shows a computer architecture 300 according to an embodiment of the invention in which the service processor 226 is able to access the firmware 212 behind the Northbridge controller 202. The computer architecture 300 can be identical to the computer architecture 200 of FIG. 2, except for the added components that enable the service processor 226 to access the firmware 212.

A first multiplexer 302, or mux, is inserted in the LPC bus 228 between the firmware 230 and the Southbridge controller 204, and a second multiplexer 304 is inserted in the LPC bus 210 between the firmware 212 and the Northbridge controller 202. Furthermore, another LPC bus 308 is added between the first multiplexer 302 and the second multiplexer 304. A multiplexer control line 306, controlled by the service processor 226, is coupled to each of the multiplexers 302 and 304. Otherwise, the architecture 300 of FIG. 3 can be the same as that of FIG. 2, and like-numbered components are otherwise not duplicatively described. Note that where the architecture 300 operates in a multi-node system, such that the architecture 300 is for a single node, other nodes are communicatively coupled to the Northbridge controller 202, as indicated by the line 314.

The control signal on the control line 306 asserted by the service processor 226 can have one of two values, to cause the control line 306 to have one of two states. Where a first value is asserted, the control line 306 is in a first state, and firmware access indicated by the lines 310 and 312 is enabled. That is, the service processor 226 can access the firmware 230, while the processor 206 can access the firmware 212, as well as the firmware 230. When a second value is asserted, the control line 306 is in a second state, and firmware access indicated by the line 316 is enabled. That is, the service processor 226 can access the firmware 212, but not the firmware 230. The processor 206 cannot access either the firmware 212 or the firmware 230.

The multiplexers 302 and 304 thus operate in unison as a system, in accordance with the control signal value asserted on the control line 306, and thus in accordance with the state of the control line 306. The multiplex control line is the control line 306, as controlled by the service processor 226. In this way, the service processor 226 is able to access the firmware 230, as indicated by the line 310, as well as the firmware 212, as indicated by the line 316.

Specific Implementation of Multiplexers

Figure 4:
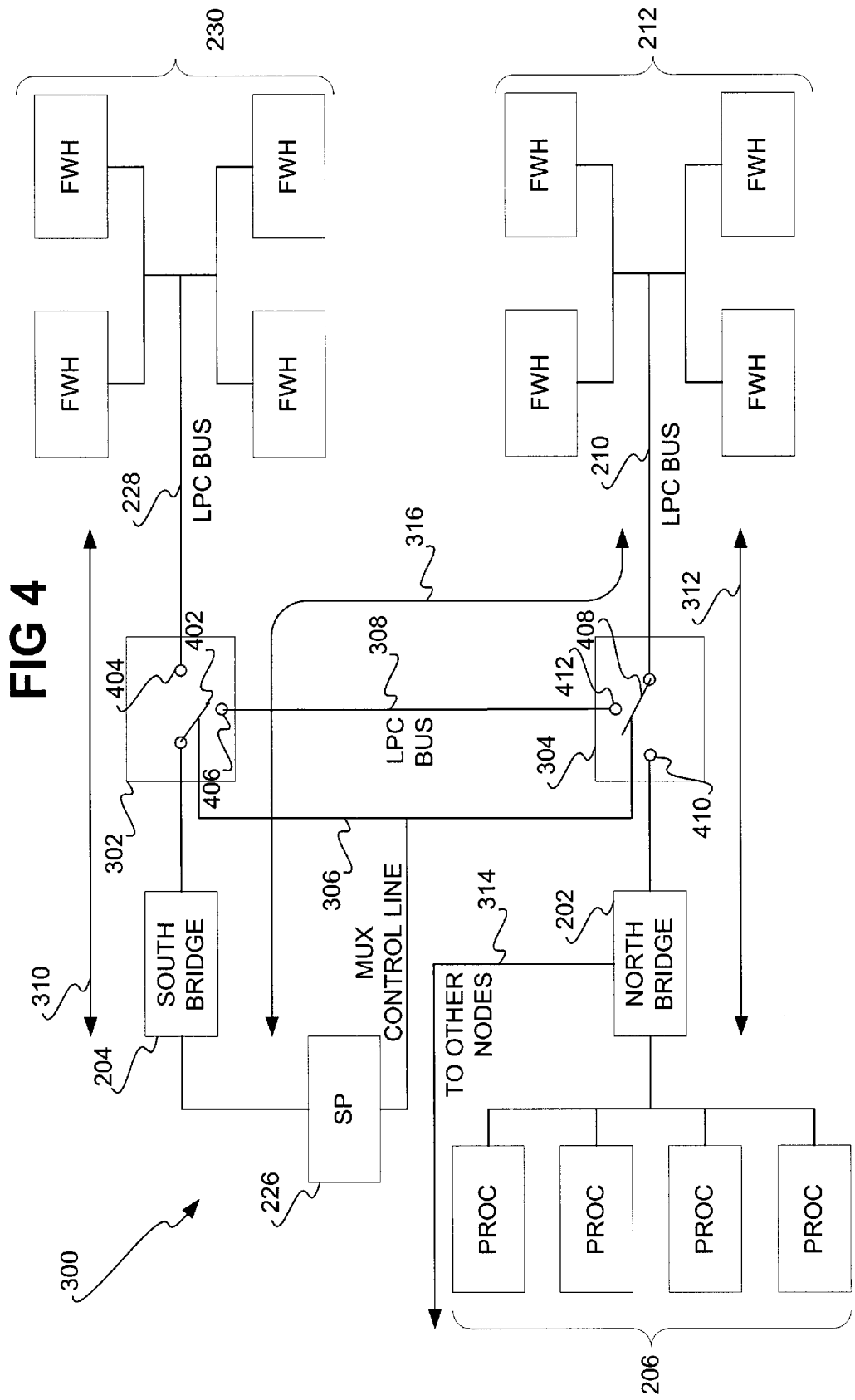
FIG. 4 is a diagram of the architecture of FIG. 3, showing in more detail how an embodiment of the invention can be implemented.

FIG. 4 shows a computer architecture 400 according to an embodiment of the invention in which detail of the multiplexers 302 and 304 of FIG. 3 is provided. The computer architecture 400 otherwise is identical to the computer architecture 300 of FIG. 3. Like-numbered components of FIG. 3 are also otherwise not duplicatively described.

The multiplexer 302 is represented as a switch 402 able to connect the left side of the bus 228 to either the right side of the bus 228, where the switch 402 makes contact with the position 404, or the bus 308, where the switch 402 makes contact with the position 406. Similarly, the multiplexer 304 is represented as a switch 408 able to connect the right side of the bus 210 to either the left side of the bus 210, where the switch 408 makes contact with the position 410, or the bus 308, where the switch 408 makes contact with the position 412. Implementation of each of the switches 402 and 408 can be accomplished by using transistors, such as field-effect transistors (FETs), by using other electrical components, or can be accomplished in other manners.

When a first control signal value is asserted by the service processor 226 on the control line 306, the switch 402 makes contact with the position 404, and the switch 408 makes contact with the position 410, enabling the paths indicated by the lines 310 and 312. This is the default state of the multiplexers 302 and 304. This enables the service processor 226 to access the firmware 230, because the left part of the bus 228 is connected to the right part of the bus 228. Similarly, the processor 206 can access the firmware 212, because the left part of the bus 210 is connected to the right part of the bus 210.

However, when a second control signal value is asserted by the service processor 226 on the control line 306, the switch 402 makes contact with the position 406, and the switch 408 makes contact with the position 412. This is the alternative state of the multiplexers 302 and 304. This enables the service processor 226 to access the firmware 212, because the bus 228 is connected to the bus 308 via the switch 402, and the bus 308 is connected to the bus 210 via the switch 408. In this state, the service processor 226 cannot access the firmware 230, and the processor 206 cannot access either firmware.

Advantages over the Prior Art

Embodiments of the invention allow for advantages over the prior art. The invention allows for access to all non-volatile memory of a computer architecture by a processor such as a service processor, even where some of the non-volatile memory is behind a bridge controller different than that behind which the service processor is located. The service processor is specifically able to access the firmware behind the Northbridge controller in addition to that behind the Southbridge controller, and not only that behind the Southbridge controller behind which the service processor is also located.

Alternative Embodiments

It will be appreciated that, although specific embodiments of the invention have been described herein for purposes of illustration, various modifications may be made without departing from the spirit and scope of the invention. For example, the invention has been substantially described in relation to bridge controllers that include a Northbridge controller and a Southbridge controller. The invention itself, however, is not so limited. For instance, the invention is also applicable to other bridge controllers, such as a memory controller hub (MHC) and an I/O controller hub (ICH). Furthermore, the invention is applicable to other types of non-volatile hardware besides firmware, in relation to which the invention has been substantially described. Accordingly, the scope of protection of this invention is limited only by the following claims and their equivalents.

I claim:

1. A method comprising:

multiplexing a first firmware of a node of a computer system and a second firmware of the node via a control line;

asserting a control signal on the control line by a service processor of the node to select one of the first firmware and the second firmware, the first firmware located behind a first bridge controller of a chipset architecture of the node behind which the service processor is also located, and the second firmware located behind a second bridge controller of the chipset architecture through which other nodes of the computer system are accessible; and, accessing the one of the first firmware and the second firmware by the service processor via a bus communicatively coupled to the first firmware, the first bridge controller, the second bridge controller, and the second firmware.

2. The method of claim 1, wherein the control signal has a first value to select the first firmware and a second value to select the second firmware.

3. The method of claim 1, wherein asserting the control signal by the service processor comprises asserting the control signal on a first multiplexer and a second multiplexer to enable one of a first state and a second state of the first multiplexer and the second multiplexer, the first state enabling access to the first firmware by the service processor, and the second state enabling access to the second firmware by the service processor.

4. The method of claim 3, wherein the first state is a default state of the first multiplexer and the second multiplexer.

5. The method of claim 1, wherein accessing the one of the first firmware and the second firmware by the service processor comprises at least one of reading from and writing to the one of the first firmware and the second firmware.

6. The method of claim 1, wherein accessing the one of the first firmware and the second firmware by the service processor comprises at least one of updating and maintaining the one of the first firmware and the second firmware.

7. A node of a computer system comprising:

a service processor;

a chipset architecture having a first bridge controller behind which the service processor is located and a second bridge controller through which other nodes of the computer system are accessible;

a first firmware located behind the first bridge controller and accessible from behind the first bridge controller by the service processor;

a second firmware located behind the second bridge controller;

a bus communicatively coupling the first bridge controller, the second bridge controller, the first firmware, and the second firmware; and, a control line extending from the service processor and multiplexing the first firmware and the second firmware to the bus, enabling the service processor to access individually the first firmware and the second firmware through the first bridge controller.

8. The system of claim 7, further comprising a first multiplexer communicatively coupled to the control line and to the bus and a second multiplexer communicatively coupled to the control line and to the bus, the service processor asserting a control signal on the control line to enable one of a first state and a second state of the first multiplexer and the second multiplexer, the first state enabling access to the first firmware by the service processor, and the second state enabling access to the second firmware by the service processor.

9. The system of claim 8, wherein the first state is a default state of the first multiplexer and the second multiplexer.

10. The system of claim 8, wherein each of the first multiplexer and the second multiplexer comprises a plurality of transistors.

11. The system of claim 7, wherein the first processor asserts a first value of a control signal for the control line to access the first firmware, and a second value of the control signal for the control line to access the second firmware.

12. The system of claim 7, wherein the first bridge controller comprises a Southbridge controller and the second bridge controller comprises a Northbridge controller.

13. An article comprising:

a computer-readable medium; and, means in the medium for asserting a control signal to access a desired firmware of a first firmware and a second firmware, the first firmware located behind a first bridge controller of a chipset architecture of a node of a computer system, and the second firmware located behind a second bridge controller of the chipset architecture and through which other nodes of the computer system are accessible.

14. The article of claim 13, wherein the means is for asserting the control signal to enable one of a first state and a second state, the first state enabling access to the first firmware, and the second state enabling access to the second firmware.

15. The article of claim 13, wherein the medium is a recordable data storage medium.

16. The article of claim 13, wherein the medium is a modulated carrier signal.

* * * * *